(12) United States Patent
de Boer et al.

(10) Patent No.: US 9,115,676 B2
(45) Date of Patent: Aug. 25, 2015

(54) FUEL INJECTION METHOD AND COMBUSTION ENGINE WITH EARLY PRE-INJECTION

(71) Applicant: EcoMotors, Inc., Allen Park, MI (US)

(72) Inventors: Christopher de Boer, Newbury Park, CA (US); Shizuo Sasaki, Camarillo, CA (US)

(73) Assignee: EcoMotors, Inc., Allen Park, MI (US)

( * ) Notice: Subject to any disclaimer, the term of this patent is extended or adjusted under 35 U.S.C. 154(b) by 262 days.

(21) Appl. No.: 13/787,636

(22) Filed: Mar. 6, 2013

(65) Prior Publication Data
US 2014/0251278 A1 Sep. 11, 2014

(51) Int. Cl.
F02D 41/40 (2006.01)
F02M 53/02 (2006.01)
F02M 31/02 (2006.01)
F02M 53/06 (2006.01)
F02M 31/18 (2006.01)
F02D 41/38 (2006.01)
F02B 51/00 (2006.01)
F02D 41/30 (2006.01)

(52) U.S. Cl.
CPC .............. F02M 31/02 (2013.01); F02B 51/00 (2013.01); F02D 41/3047 (2013.01); F02D 41/38 (2013.01); F02D 41/402 (2013.01); F02M 31/18 (2013.01); F02M 53/06 (2013.01)

(58) Field of Classification Search
CPC ....... F02M 31/02; F02M 31/18; F02M 53/02; F02M 53/06; F02D 41/402; F02D 41/38; F02D 41/3029; F02D 41/3035; F02D 41/3041; F02D 41/345; F02D 41/3818; F02D 41/3827; F02B 17/005; F02B 51/00
USPC ........................................ 123/299, 305, 304
See application file for complete search history.

(56) References Cited

U.S. PATENT DOCUMENTS

| | | | |
|---|---|---|---|
| 6,213,104 B1 * | 4/2001 | Ishikiriyama et al. ........ | 123/557 |
| 6,276,347 B1 * | 8/2001 | Hunt .............................. | 123/549 |
| 6,390,076 B2 * | 5/2002 | Hunt .............................. | 123/549 |
| 7,546,826 B2 * | 6/2009 | Cheiky .......................... | 123/297 |
| 7,657,363 B2 * | 2/2010 | Cheiky .......................... | 701/106 |
| 7,743,754 B2 * | 6/2010 | Cheiky .......................... | 123/549 |
| 7,762,236 B2 * | 7/2010 | Frick et al. .................... | 123/472 |
| 2003/0188700 A1 * | 10/2003 | Mitsuhashi et al. ......... | 123/25 C |
| 2006/0107586 A1 * | 5/2006 | Tavlarides et al. .............. | 44/628 |
| 2009/0038583 A1 * | 2/2009 | Gwidt et al. .................. | 123/299 |
| 2009/0210132 A1 * | 8/2009 | Porten et al. .................. | 701/103 |
| 2009/0255508 A1 * | 10/2009 | Cheiky .......................... | 123/301 |
| 2011/0057049 A1 * | 3/2011 | Hofbauer et al. ................. | 239/5 |
| 2012/0004826 A1 * | 1/2012 | Shimo et al. .................. | 701/103 |
| 2013/0081592 A1 * | 4/2013 | Boer et al. .................... | 123/299 |

* cited by examiner

Primary Examiner — Lindsay Low
Assistant Examiner — George Jin
(74) Attorney, Agent, or Firm — Barnes & Thornburg LLP

(57) ABSTRACT

A fuel injection method in an internal combustion engine and an internal combustion engine for performing the fuel injection method. The method includes heating fuel to a temperature between 300° F. and 840° F. (150 and 450° C.); pressurizing the fuel to a pressure exceeding 40 bar; pre-injecting at least 10% of the fuel charge as a pre-injected fuel during the intake stroke; injecting a fuel charge over at least part of the compression stroke into the cylinder; and injecting an ignition-injection of at least 10% of the fuel in a supercritical condition during the compression stroke at a rotational angle between 90° BTDCF and TDCF into the cylinder. The method and related combustion engine create a good mix of premix combustion and diffusion combustion increasing efficiency and consequently reducing emissions to the environment while also keeping noise and vibrations low.

29 Claims, 11 Drawing Sheets

FUEL INJECTION METHOD AND COMBUSTION ENGINE WITH EARLY PRE-INJECTION

TECHNICAL FIELD

The present invention relates to a fuel injection method in an internal combustion and an internal combustion engine implementing the fuel injection method.

DESCRIPTION OF THE RELATED ART

Much of the world's energy consumption is dedicated to powering internal combustion based vehicles. Most gasoline and diesel car engines are only 20-30% efficient, such that a major portion of the hydrocarbon fuels is wasted, thereby depleting global resources while producing an excessive quantity of pollutants and greenhouse gases. With hydrocarbon fuels becoming more scare and more expensive it is desirable to obtain more efficient use of those fuels.

Internal combustion engines typically use one or more fuel injectors to inject fuel into a combustion chamber of the engine. Typical fuel injectors may have hydraulically, electromagnetically, or piezoelectrically actuated injector pins. A piezoelectric element is a material that changes dimensions when a voltage is applied across the element. When the voltage is removed, the piezoelectric element returns to its original dimensions. When used as actuators, many piezoelectric elements are stacked together to form larger piezoelectric elements or "piezoelectric stacks" to increase the displacement of the actuator. In a piezoelectrically actuated fuel injector, one or more of these piezoelectric elements or piezoelectric stacks are used to actuate a fuel injector pin for fuel metering into an internal combustion engine.

The timing of fuel injection can be controlled either electronically or mechanically. In a mechanical system, fuel injectors are generally driven by the crankshaft of the engine via belts, gears or chains. Typically, the fuel injectors are mechanically and synchronously coupled to the crankshaft such that the timing of fuel injection coincides with the intake and or compression strokes of the engine's piston. In an electronic system, fuel is generally injected into the combustion chamber by regulating an electric solenoid in each fuel injector. The timing for the solenoid is controlled by a computer, which controls the electrical current going into a magnetic coil of the fuel injector.

Generally, a fuel system has to maintain a certain pressure prior to the fuel injection. For a diesel type engine, this pressure can be very high. A pressure of 30,000 psi (200 MPa) or more can be typical in the fuel system of a diesel engine. For a gasoline type engine with spark ignition the fuel pressure is generally in the range of 3,000 psi (20 MPa). Fuel pressure is generally provided by a fuel pump that obtains fuel from a fuel reservoir (i.e, gas tank). To help dampen pressure variations in the system, a pressure regulator or accumulator may be connected to the outlet of the fuel pump. In alternative embodiments, the pressure may be generated directly by the fuel injectors which may be equipped with a pressurizing ram. Metering of the fuel amount can be accomplished by adjusting the stroke of the pressurizing ram.

While in the prior art the fuel was typically not heated prior to injection, it assumes typically a temperature that was similar to the motor block that is cooled to a temperature of about 100° C.

While in the prior art injection it was known to split the injection into several parts, typically a pre-injection and a main injection, such pre-injection predominantly took place during the compression stroke or at least close to the bottom dead center before firing.

Combustion typically distinguishes between 2 types of combustion, namely the so-called premixed combustion that typically takes place within an angle of 0 to 20° after top dead center firing ATDCF and burns fuel that was injected during the ignition-injection relatively close to the top dead center firing TDCF. A more traditional type of combustion is named diffusion combustion and takes place over a longer time period. This type of combustion may for instance be triggered by a spark plug igniting the fuel well before TDCF and establishes a flame front that gradually travels through the fuel and air mixture. While the premixed combustion is relatively effective, some problems might arise from this relatively intense combustion over a relatively short angle. For instance, noise might be generated by the premixed combustion. It might therefore be desirable to modify the premixed combustion without losing the entire effect of the more effective premixed combustion, but on the other hand remove disadvantages such as noise and vibrations. Therefore, a mix of both types of combustion might be desirable. A relatively complicated method of combining both types of combustion was known as Reaction Controlled Compression Ignition, also known by the acronym RCCI. However, RCCI required a pre-injection of the low reactivity fuel such as gasoline and a later injection ignition of a high reactivity fuel such as diesel. As a practical solution, 2 types of fuel are typically not acceptable, for instance for motor vehicles as it requires 2 fuel tanks and 2 different types of injectors.

Another prior art concept for creating a mix of both types of combustion was known as jet ignition that also required two injectors plus an additional pre-combustion chamber that created a pre-combustion that ignited the fuel mixture in the larger combustion chamber. The additional pre-combustion chamber also required an extra injector as well as a spark plug.

It is an object of the invention to create a good mix of both types of combustion but use only one single type of fuel and only one single injector.

It is another object of the invention to increase the efficiency of the combustion by a well-balanced mix of both types of combustion. The efficiency increase also reduces emissions to the environment.

It is a further object of the invention to achieve a desired degree of diffusion combustion but without requiring a spark plug for ignition.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

SUMMARY OF THE INVENTION

According to the present invention, this is achieved by a fuel injection method in an internal combustion engine comprising at least one piston that is connected to a crankshaft and reciprocates within a cylinder between a top dead center and a bottom dead center while the crankshaft rotates between an angular range of 360° before top dead center firing BTDCF and the top dead center firing TDCF, the piston performing over at least part of the range between 360° and 180° BTDCF an intake stroke and over at least part of the rotational angle between 180° BTDCF and TDCF a compression stroke, said method comprising: heating fuel to a temperature between 300° F. and 840° F. (150 and 450° C.); pressurizing the fuel to a pressure exceeding 40 bar; pre-injecting at least 10% of the fuel charge as a pre-injected fuel during the intake stroke; injecting a fuel charge over at least part of the compression stroke into the cylinder; and injecting an ignition-injection of at least 10% of the fuel in a supercritical condition during the compression stroke at a rotational angle between 90° BTDCF and TDCF into the cylinder. One of the advantages the incident invention offers is that due to the heating of the pre-injected fuel even for low reactivity fuels such as gasoline ignition can be accomplished without a spark plug. Part of the reason is a better mixing of the fuel with the intake air and breaking it into finer droplets so that the partial fuel pressure in the fuel is higher giving it a higher propensity to evaporate. The other advantage is a balanced combustion comprising both premixed combustion and diffusion combustion wherein the diffusion combustion is for a major part attribute it to the pre-injected fuel that has been pre-injected at relatively large angles BTDCF such as for instance starting at an angle of 270° BTDCF or even earlier.

The object of the invention is further achieved by an combustion engine comprising: at least one piston that is connected to a crankshaft and reciprocates within a cylinder between a top dead center and a bottom dead center while the crankshaft rotates between an angular range of 360° before top dead center BTDCF and the top dead center TDCF, the piston performing over at least part of the range between 360° and 180° BTDCF an intake stroke and over at least part of the rotational angle between 180° BTDCF and TDCF a compression stroke; a fuel injector arranged in fluid connection with the cylinder; a heater for heating the fuel prior to injection to a temperature between 300° F. and 840° F. (150 and 450° C.); a pump pressurizing the fuel prior to injection to a pressure of at least 40 bar; and a control connected to the fuel injector, said control being configured to control the magnitude of the fuel charge to be injected during a cycle between 0 and 360°, to pre-inject at least 10% of the fuel charge as a pre-injected fuel during the intake stroke; to inject a fuel charge over at least part of the compression stroke into the cylinder; and to inject an ignition-injection of at least 10% of the fuel in a supercritical condition during the compression stroke at a rotational angle between 90° BTDCF and TDCF into the cylinder.

DETAILED DESCRIPTION OF THE INVENTION

Preferably, the pre-injected fuel charge during the intake stroke can be between 10 and 20% of the total fuel charge, but also other ranges like between 20 and 30% of the fuel charge is pre-injected during the intake stroke or between 30 and 50% of the fuel charge is pre-injected during the intake stroke or between 50 and 90% of the fuel charge is pre-injected during the intake stroke are possible. Start of injection timing of the pre-injected fuel can be in the range 360° to 180° BTDCF. Similarly the injected fuel charge during the compression stroke, also known as the ignition-injection, can be up to 90% of the total fuel charge injected during the intake and compression cycle. Start of injection ignition timing can be in the range 180° to 360° BTDCF. Accordingly, with late timing of the ignition-injection it is possible for the ignition-injection to continue after TDCF until such time as the injection is complete.

Preferably, the pre-injected fuel is heated and pressurized to assume supercritical conditions prior to pre-injecting. When supercritical fuel is injected as a pre-injection during the intake stroke between 360° to 180° BTDCF the temperature and pressure in the cylinder results in the fuel condensing into liquid droplets. The condensed fuel droplets have droplet sizes much lower than is achieved by liquid fuel injection. During the compression stroke the fuel and air mixture is compressed and heated which results in the rapid evaporation and mixing of the fuel with the air. When supercritical fuel is injected as an ignition-injection during the compression stroke and the temperature and pressure in the cylinder are above those of the supercritical fuel temperature the fuel mixes with the air and remains in the supercritical condition.

Preferably, the fuel injection method comprises the method steps of pre-injecting the pre-injected fuel under supercritical conditions; at least partially condensing the supercritical pre-injected fuel to droplets; and compressing the fuel charge during the compression stroke to reach supercritical conditions prior to injecting the ignition-injection.

According to a preferred alternative embodiment, the fuel injection method comprises pre-injecting the pre-injected liquid fuel under heated conditions to break up into droplets; at least partially vaporizing the pre-injected fuel within the cylinder to become fuel vapor; and compressing the fuel charge during the compression stroke to reach supercritical conditions prior to injecting an ignition-injection. According to this alternative embodiment, the heated fuel may stay partially in a liquid state but would still break up into fine droplets due to its heated condition. Further, a part evaporates. The result is still much finer droplets than what could be accomplished by injecting non-heated fuel. While typically finer droplets can be achieved by condensation after injection straight from the supercritical phase, it may depend on the level of reactivity of the fuel how fine the fuel droplets and mixing with air should be for avoiding an early self-ignition during the compression stroke. Another parameter is the amount of the pre-injected fuel. For example, while it may be desirable to pre-inject low reactivity fuel such as gasoline in the supercritical phase, while when pre-injecting an equivalent amount of diesel fuel it might be sufficient to pre-inject under heated conditions that do not rise to the level of supercritical.

Preferably, the pre-injecting amounts to a range between 10 and 90% of the fuel charge as pre-injected fuel during the intake stroke, and injecting between 10 and 90% of the fuel charge as ignition-injection fuel during the compression stroke.

Preferably, at least one of the pre-injected fuel and the ignition-injection fuel are under supercritical conditions prior to and during injection.

Preferably, the fuel injection further comprising that both of the pre-injected fuel and the ignition-injection fuel are under supercritical conditions prior to and during injection. For example, the fuel may preferably be gasoline and pressured to at least 40 bar and heated to a temperature between 280° C. and 350° C. According to another preferred embodiment, the fuel may be diesel fuel and pressured to at least 40 bar and heated to a temperature between 380° C. and 450° C.

Preferably, the fuel injection method comprises dividing the pre-injection into a series of small individual pre-injection shots. This stretches the pre-injections over a range of angles during the intake stroke and possibly extending into the compression stroke. Small individual pre-injection shots at varying angles during the intake stroke can be beneficial to fuel distribution in the cylinder resulting in improved fuel mixing with air and reduced exhaust emissions.

Preferably, the pre-injection starts as early as right after closing of the exhaust valve during the intake stroke at an angle between 355 and 345° before dead center BTDCF. Optimum start of injection is typically around 270° BTDCF since at this location the piston has maximum velocity and the intake air flow also has maximum velocity and mixing potential. Injecting earlier in the cycle has reduced velocities and also a smaller amount of the total charge is available for mixing with the fuel. Injecting later in the cycle results in reducing intake air velocities, an increased proportion of the intake charge mass becoming available and a later completion of the injection process. The latter reduces the mixing time of the fuel with the air before combustion thus compromising the mixture quality. Optimization of the start of injection is therefore subject to complex interactions is carried out experimentally.

Preferably, the internal combustion engine comprises such a compression ratio that the fuel charge during the compression stroke reaches supercritical conditions prior to injecting an ignition-injection.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
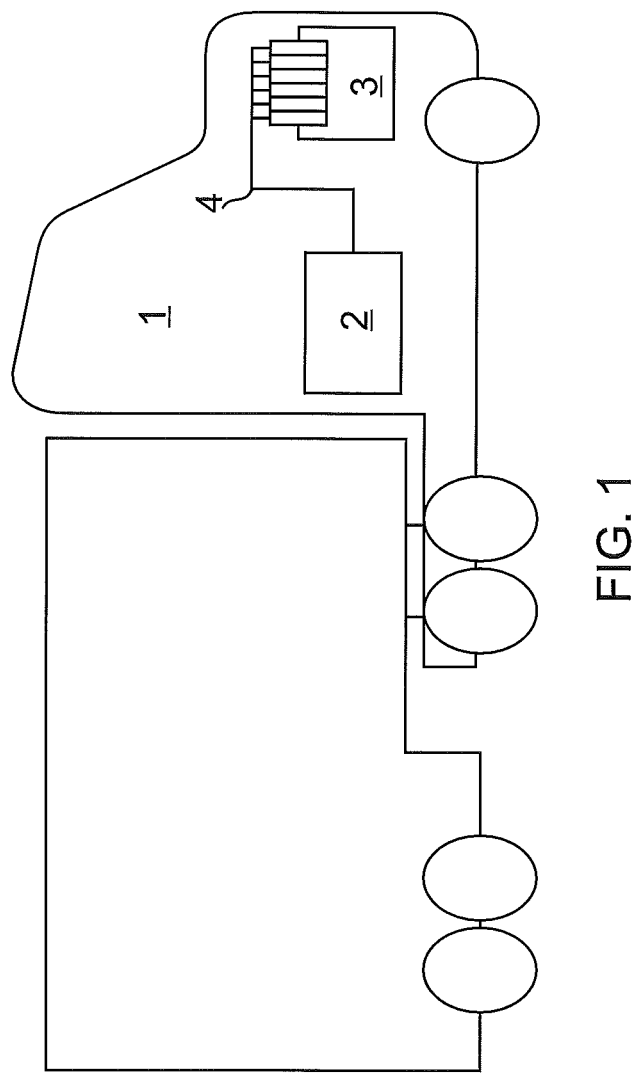
FIG. 1 illustrates an example vehicle in which an embodiment of the invention may be employed.
Figure 2:
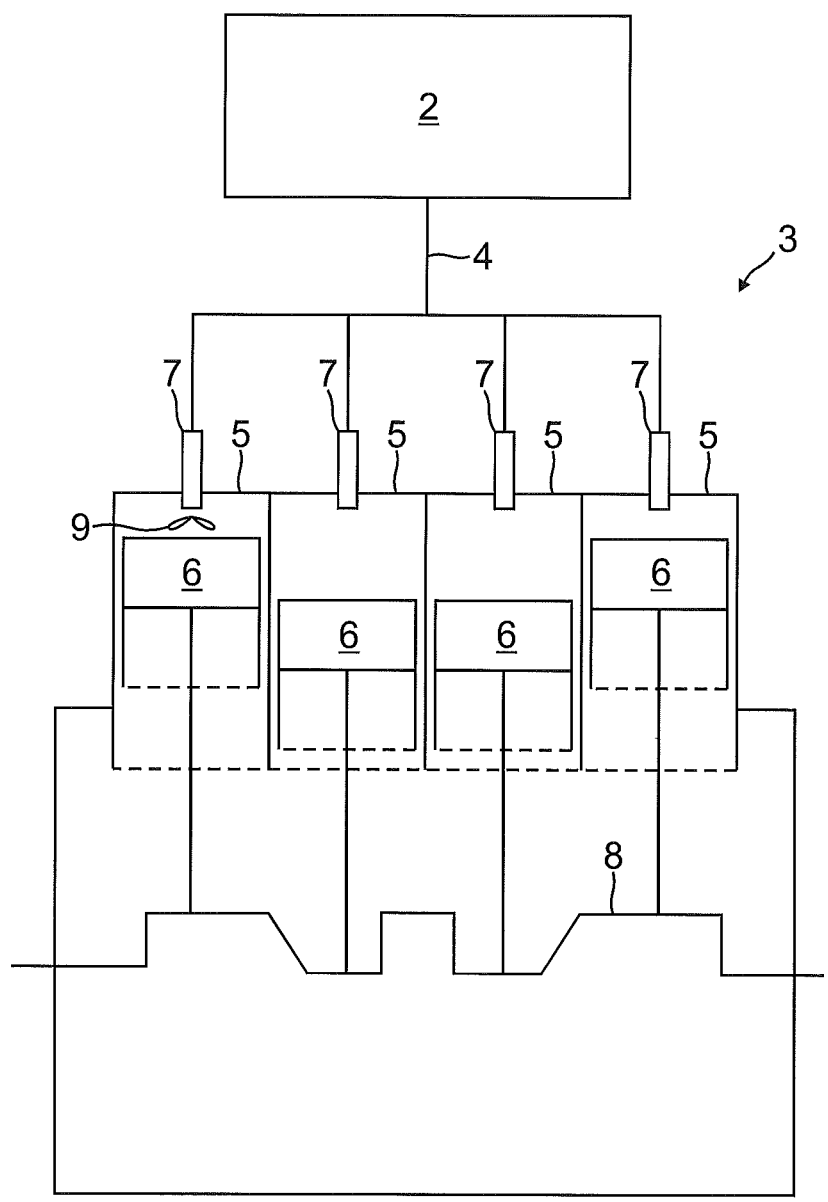
FIG. 2 illustrates an example in which an embodiment of the invention may be employed.

Before describing the invention in detail, it is useful to describe a few example environments with which the invention can be implemented. One such example is that of a vehicle powered by internal combustion engine. FIG. 1 illustrates such a vehicle 1. A fuel supply 2 is disposed within the vehicle and coupled to an engine 3 by a fuel line 4. Fuel from fuel supply 2 is used to power engine 3 to provide motive power to vehicle 1. A more particular example is that of an internal combustion engine as illustrated with respect to FIG. 2. Engine 3 comprises a plurality of cylinders 5 having pistons 6 disposed therein. A plurality of fuel injectors 7 is configured to supply fuel to engine 3 and is connected 4 to a fuel source 2. Pistons 6 and cylinders 5 are configured to form combustion chambers into which fuel 9 is metered from fuel injector 7 during a power stroke of the engine. When the fuel 9 is mixed with air and ignited, the piston 6 is displaced, thereby turning crankshaft 8 and providing motive force.

The present invention is directed toward a system and method for controlling a pump based on the rotational displacement vs. output pressure profile of the pump.

Figure 3:
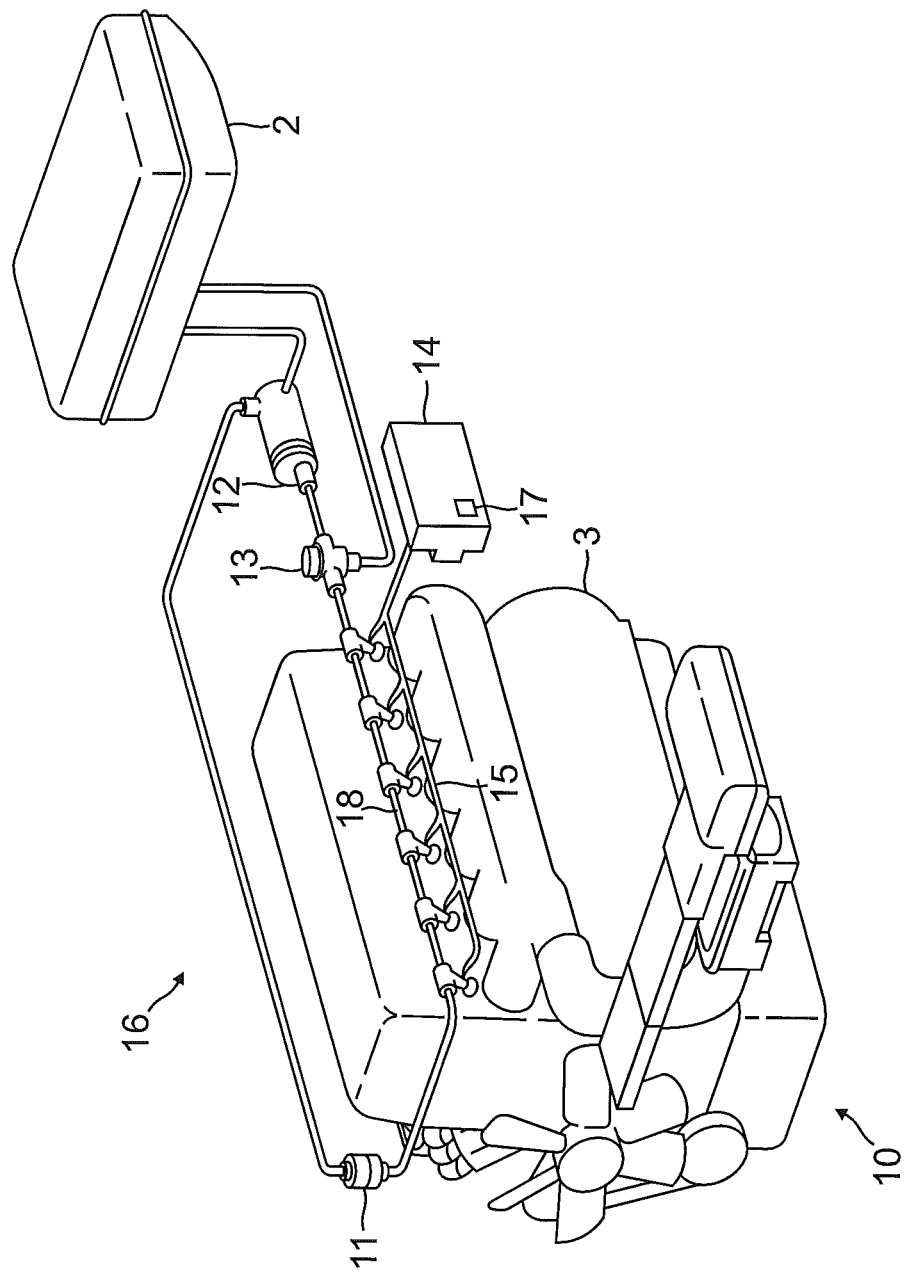
FIG. 3 illustrates an example environment in which a pump system can be implemented according to one embodiment of the present invention.

Before describing the invention in detail, it is useful to describe a few example environments with which the invention can be implemented. One such example is that of an engine system in a motor vehicle. FIG. 3 illustrates an engine system 10 that includes the engine 3, the fuel tank 2, a fuel filter 11, a pump 12, a pressure regulator or accumulator 13, a computer 14, and fuel injectors 15. These components, not including engine 3, comprise a fuel system 16. The computer 14 may include an engine control unit (ECU) 17 that receives a throttle input from a pedal sensor (not shown). The ECU outputs an appropriate fuel pressure and displacement volume request to the motor of pump 12. The ECU at the same time outputs an injector actuation request to a plurality of fuel injectors for the engine.

The pump 12 draws fuel from fuel tank 2 and forces the fuel to pressure regulator 13, which controls the fuel pressure entering into fuel injectors 15 of engine 3. Pressure regulator 13 helps maintain a certain level of pressure at the input of each fuel injector 15. When the pressure in the system exceeds a predetermined maximum pressure, pressure regulator 13 bleeds the excess fuel and pressure back into fuel tank 2. In this way, fuel system 16 and engine 3 are protected from over pressure or pressure spikes. In addition, the pressure regulator 13 can be used to release the pressure from the system when desired by the engine control unit of computer 14. One such instance can be when the vehicle is stopped and idling and a lower pressure is demanded. The opening of the pressure regulator 13 allows for a quicker and more efficient operation of the pump 12 by allowing for an immediate "dump" or release of pressure.

The fuel filter 11 is typically installed between pump 12 and pressure regulator 13. The fuel filter 11 is responsible for filtering particulates and impurities that may exist in the fuel inside of fuel tank 2. In this way, engine 3 is protected from particulates that could cause damage to engine 3.

Fuel system 16 can be implemented on various types of engines such as gasoline and diesel engines. As shown in FIG. 3, fuel injectors 15 of engine 3 are electronically controlled fuel injectors. The fuel injectors can be used in engines using port or direct injection. In the illustrated embodiment, each of the fuel injectors 15 is an electric solenoid valve fuel injector.

In one embodiment, the pump 12 supplies the fuel injectors 15 with supercritical fuel in order to improve the power and efficiency of the engine 3. To open the solenoid valve and allow fuel to enter engine 3, computer 14 sends a current to a magnetic armature inside within fuel injector 15. Once the armature is charged, an electric field forms and attracts the solenoid to create a passage into the combustion chamber of engine 3. The timing for current discharge is regulated by computer 14. This can be done using feedback from sensors inside of engine 3. One example of such sensors is the engine's shaft position sensor. By determining the position of the engine crankshaft, computer 14 can calculate the position of the piston and determine the timing for current discharge.

In fuel system 16, pump 12 and pressure regulator 13 together maintain the fuel pressure inside of a common rail 18, which feeds fuel to each of the fuel injectors 15. As mentioned, the solenoid of fuel injector 15 opens whenever an electric current is discharged. The timing of the electric current discharge is based on the position of the piston or crankshaft of engine 3. Thus, to maintain a generally constant pressure inside of common rail 18 when engine 3 is operating at a high speed, the operating rotational displacement or revolution of fuel pump 12 has to also increase to compensate for the pressure lost as a result of fuel and pressure being bled into each of the fuel injectors 15. In further embodiments, such fuel pressure and engine rotational displacement relationship can be maintained in systems that employ mechanical fuel injectors instead of electronic fuel injectors.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 4:
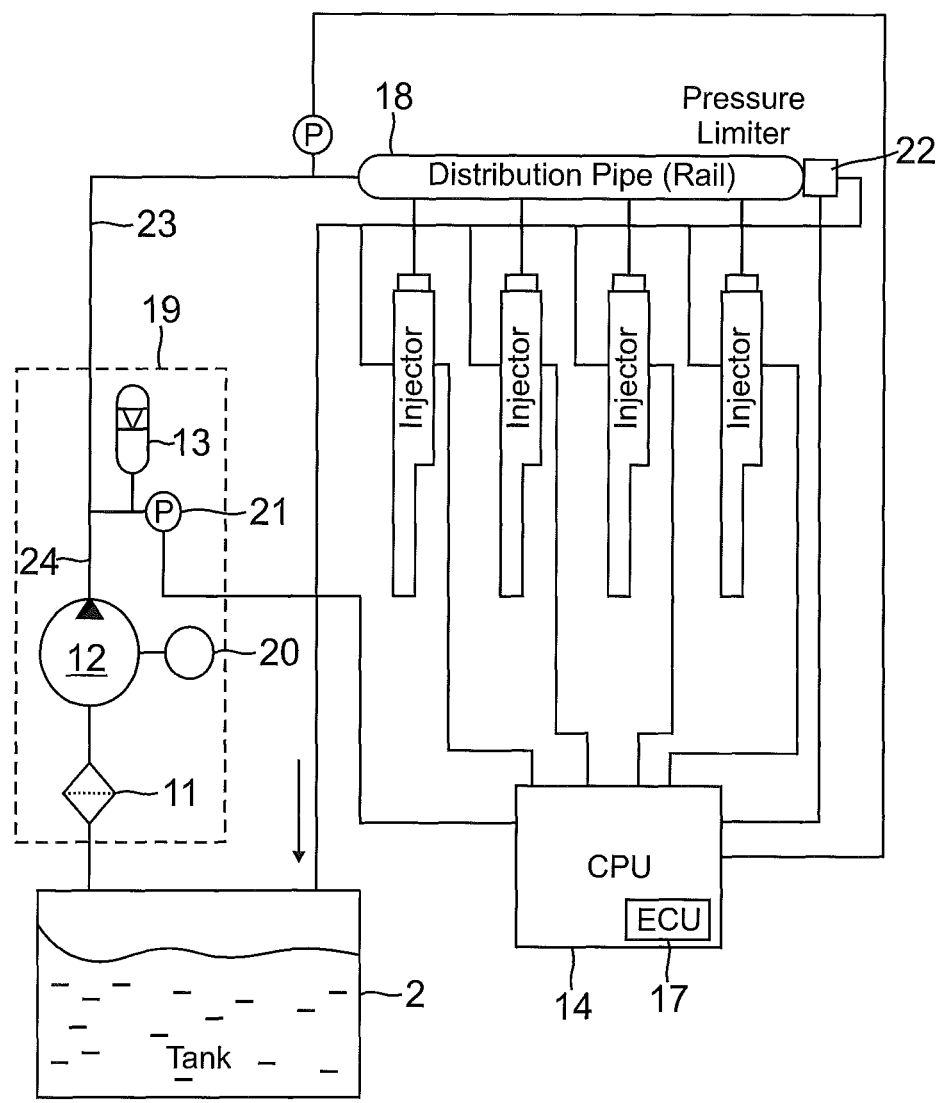
FIG. 4 illustrates an example pump system according to one embodiment of the present invention.

FIG. 4 illustrates a pump system 19 according to one embodiment of the present invention. Pump system 19 includes a fuel tank 2, a fuel filter 11, a fuel pump 12, a tachometer 20, pressure regulator or accumulator 13, a pressure sensor 21, a distribution sensor 22, a distribution channel 23, and a computer 14 having an electronic control unit 17. On a high level, fuel pump 12 draws fuel through fuel filter 11 and supplies the fuel to an engine (or other device that requires pressurized fluid) via distribution channel 23. In one embodiment, distribution channel 23 is a common rail 18 configured to supply fuel to a plurality of fuel injectors 15. Other types of distribution channel 23 can also be used in place of common rail 18.

In pump system 19, pump 12 can be a positive displacement pump. Pump 12 is preferably a radial piston pump having a high efficiency with minimal to no leakage of fluid out of the piston pumping chambers. The motor attached to pump 12 rotates a shaft that runs the pump. Each rotation of the motor shaft corresponds to a set volume of fluid pumped by the pump pistons. Tachometer 20 can be configured to sense the rotational displacement of the motor shaft as it relates to volume of fluid pumped and sends the rotational displacement data to computer 14. Tachometer 20 can be a hall sensor having 1-3 poles depending on the needs of the user.

Pressure sensor 21 can be configured to monitor the pressure of the fluid at an outlet 24 of pump 12 and send the pressure data to computer 14. For every rotational displacement value or tachometer count of the motor of pump 12 there is a corresponding fluid pressure value at outlet 24. Computer 14 records and tabularizes the pressure and motor rotational displacement data to create a motor rotational displacement vs. pressure profile for pump 12. The rotational displacement and pressure data can be collected using recording means for storing the data into a memory and/or transmitting the data to a remote data storage system. The pressure data may be analog or digital data.

In one embodiment, the motor of pump 12 is a brushless direct current motor. The brushless direct current motor can be best suited for the stop and start type requests that are sent by computer 14. A stepper motor can also be used using 4-8 poles if more discrete control of the motor is needed. Alternatively, a synchronous alternating current motor could be used in situations where a slower responding motor is desired. In this way, accurate control of the pump motor for optimal combustion with the ability to stop and start the pressure of the pump as needed can be achieved. Further, the pump can be started to attain optimal pressure at idle to allow for quick and efficient firing of the injectors when the throttle is actuated after idling.

In pump system 19, accumulator 13 is preferred but not required. As mentioned, accumulator 13 helps dampen pressure variations, particularly small pressure variations within pump system 19. Where pump system 19 incorporates accumulator 13, pressure sensor 21 can be configured to measure the pressure at an outlet of accumulator 13 and to send the measured pressure data to computer 14 or other data storage devices. In one embodiment, pressure sensor 21 can be integrated into accumulator 13. Pressure sensor 21 may comprise a computer module with data collection and transmission capabilities.

With accumulator 13, the rotational displacement vs. pressure profile will be different than a pump system without accumulator 13. Thus, a new rotational displacement vs. pressure profile will have to be produced for a pump system with accumulator 13. As mentioned, for any rotational displacement value of the motor of pump 12 there is a corresponding fluid pressure value at the output of accumulator 13. Computer 14 or pressure module 21 can be configured to record and tabularize the pressure and motor rotational displacement data to create a motor rotational displacement vs. pressure profile for system 19 with accumulator 13.

Once the rotational displacement vs. pressure profile is established for pump system 19, the fluid pressure at the output of accumulator 13 can be accurately controlled by varying the rotational displacement of the pump motor based on the established rotational displacement vs. pressure profile.

In one embodiment, pump system 19 is connected to common rail 18, which can be connected to a plurality of fuel injectors. The fuel pressure at the output of accumulator 13 may be affected by the presence of the common rail; thus, a new motor rotational displacement vs. pressure profile should be developed for this particular arrangement. A specific rotational displacement vs. pressure profile should be developed in view of what distribution channel 23 is connected to (e.g., a common rail of a diesel engine, a common rail of a gasoline engine, etc.).

In one embodiment, computer 14 may initiate a learning mode or self-tuning mode to develop a rotational displacement vs. pressure profile for pump system 19 upon a request of the user or at a predetermined time such as after a maintenance routine. The self-tuning mode can take place before the engine is started and essentially is the operation of the pump in a closed loop to create a rotational displacement vs. pressure profile for the pump system.

Figure 5:
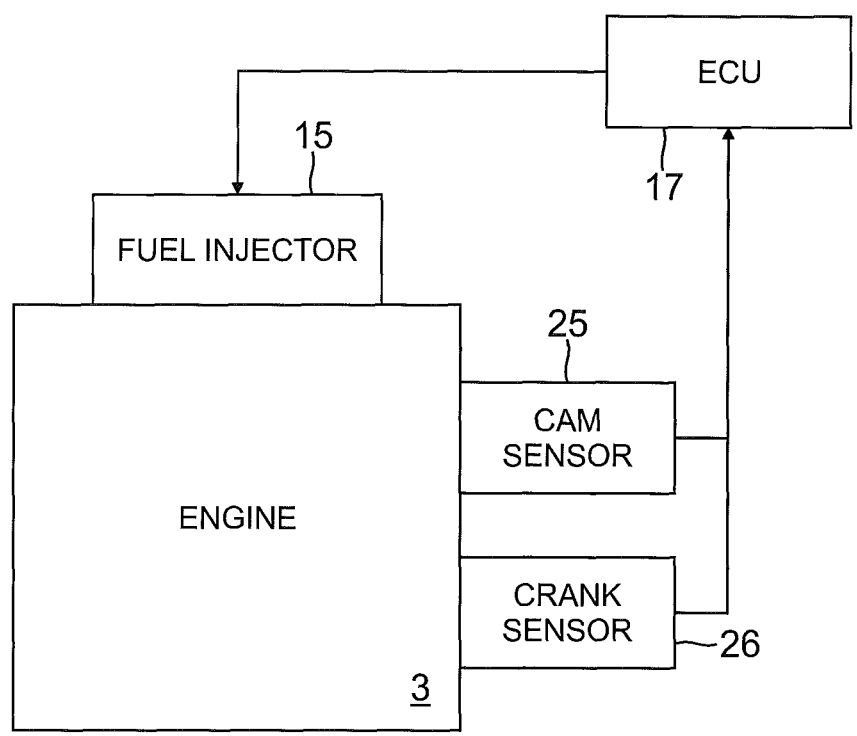
FIG. 5 illustrates an environment in which embodiments of the invention might be implemented.

FIG. 5 illustrates an example environment in which the present invention may be implemented. Engine 3 may comprise, for example, a gasoline direct injection engine, a diesel engine, or any other fuel injected internal combustion engine. Sensors such as cam sensor 25 and crank sensor 26 provide engine operating data to the engine control unit (ECU) 17. The ECU 17 uses this data to determine where on the operating plane the engine is currently operating. As described herein, using this information and predetermined injection pin profiles spanning the engine operating plane, the ECU determines an injection pin profile for the engine's 3 fuel injectors at the operating point. The fuel injector 15 is in connection with the ECU 17, for example via a fuel injector driver, and is caused to inject fuel into the engine 3 according to the injection pin profile determined for the current operating point.

Figure 6:
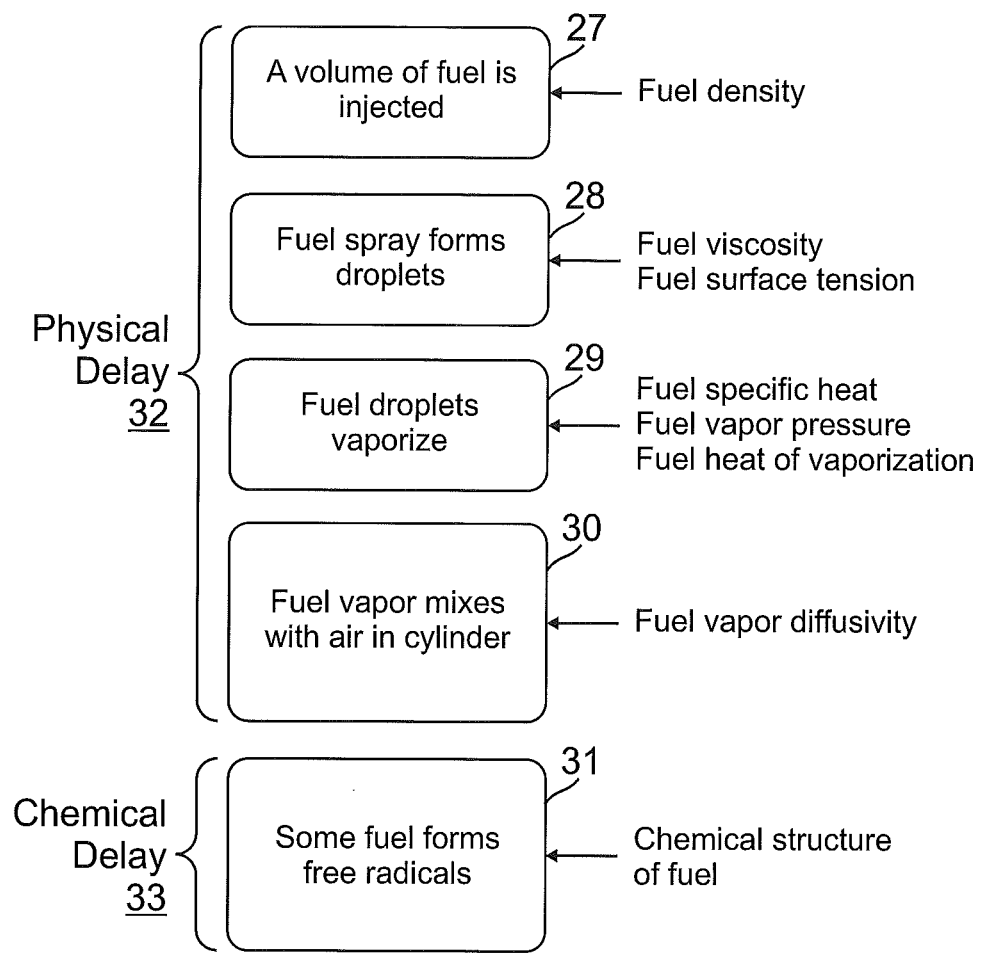
FIG. 6 is a diagram of the fuel compression ignition process in an internal combustion engine, illustrating physical delay processes and chemical delay processes.

FIG. 6 illustrates physical and chemical processes that impact the compression ignition delay of fuels. In the ignition process, a volume of fuel is injected at step 27 into a combustion volume in a spray. Then, the fuel spray forms into droplets at step 28. The fuel droplets then vaporize at step 29 and the fuel vapor mixes at step 30 with air present in the combustion volume, here a cylinder of an internal combustion engine 3. Next, the fuel undergoes chemical processes such as the formation of free radicals at step 31. After these physical and chemical processes, the fuel ignites.

During the ignition process, various fuel characteristics introduce delay including physical delay 32 and a chemical delay 33. During the injection step 27, fuel density impacts physical delay 32. During droplet formation 3, fuel viscosity and surface tension impact physical delay 32. During vaporization 29, the specific heat, vapor pressure, and heat of vaporization impact ignition delay (i.e., physical delay 32). During mixing 2, the fuel vapor diffusivity impacts ignition delay (i.e., physical delay 32). Finally, during the chemical ignition process, the chemical structure and composition of the fuel impacts the chemical delay 33.

Figure 7:
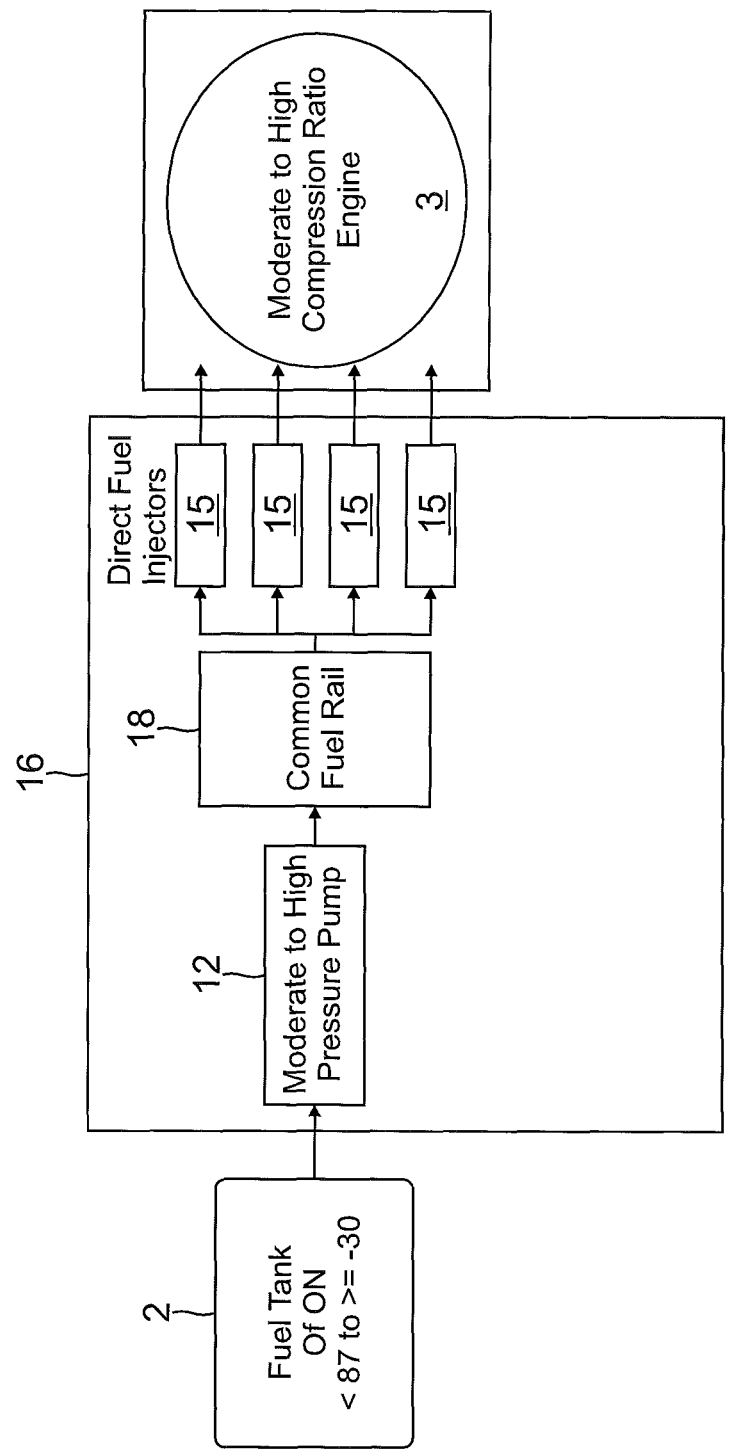
FIG. 7 illustrates a fuel supply system for a compression ignition engine as it can be employed in the present invention.

FIG. 7 illustrates an embodiment where the fuel injection system 16 compensates for the physical delays in the combustion process, thereby reducing the ignition delay, for instance to allow for the use of low octane fuels in a compression ignition engine. The fuel tank 2 containing fuel having an octane value less than 87 and greater than or equal to −30 provides fuel for the fuel injection system 16.

The illustrated fuel injection system 16 comprises a moderate to high-pressure fuel pump 12 i.e. in a range of 4 to 210 MPa, with a preferred range of 14 to 32 MPa. The fuel pump 12 pumps fuel through a common fuel rail 18 to a plurality of direct fuel injectors 15. Here, a heat source is used to heat the fuel or ambient environment of the fuel to a predetermined minimum temperature before it is injected into the engine 3. By way of example, a range of 12:1-20:1 compression ratio may be employed. Through this heating, the ignition delays are reduced such that fuels having octane ratings (ON) between 87 and 30 may be used in engine 3, with a preferred ON range of between 50 and 65.

In some embodiments, fuel injectors 15 directly inject fuel into the engine 3 as a liquid. This may comprise heating the fuel, and optionally pressurizing the fuel, such that the fuel is present in a supercritical fluid phase. In other embodiments, the phase of the fuel comprises a sub-critical liquid phase. In these embodiments, heating the fuel comprises heating the fuel to a predetermined minimum temperature. This enables the use of a fuel 2 comprising a gasoline type fuel with an octane rating less than 87 and greater than or equal to 30. In some embodiments, fuel with these octane ratings may be produced through mixing mainstream gasoline type fuel (having octane ratings greater than or equal to 87) with diesel fuel or other low octane fuels. In other embodiments, the fuel may be produced directly through petroleum distillation or other fuel production methods.

In some embodiments, it may be difficult to directly determine the fuel temperature before it is metered into the engine. Accordingly, heating the fuel to the predetermined minimum temperature may be achieved by heating the fuel injector to a temperature determined to heat the fuel to the predetermined minimum temperature. In some embodiments, the fuel injectors may be heated to temperatures between 150 [deg.] C. and 550 [deg.] C., which results in the fuels being heated to the proper temperature for the desired ignition delay value. In other embodiments, heating elements may be disposed in the fuel injectors to allow heating of the fuel. In further embodiments, the specific temperature to which the injector is heated is dependent on (i) the octane rating of the specific fuel being used, and (ii) the ignition delay desired for compression engine operation.

In some embodiments, the reduced ignition delays achieved through fuel heating may enable the use of fuels having octane ratings between 87 and −30 without the use of additional fuel conditioning processes. For example, catalytic cracking or reformation, or blending the fuel with non-standard additives or water is not required for operating the moderate to high compression ignition engine because of the reduced ignition delays achieved through this invention.

Figure 8:
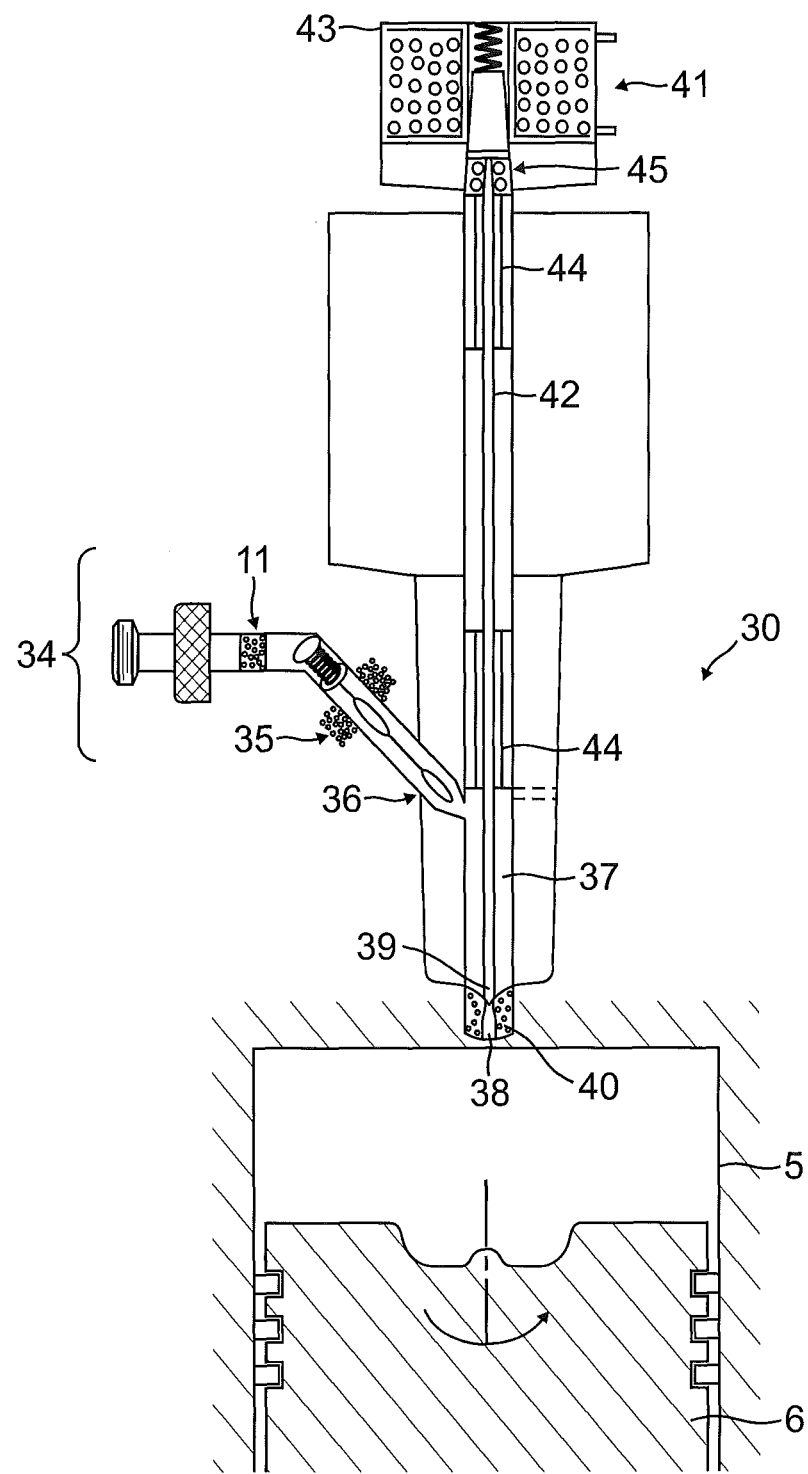
FIG. 8 is a sectional view of an exemplary heated injector-ignition fuel injector showing the fuel inlet and outlet subsystems.

Referring to FIG. 8, the input fuel metering system 34 of the all-in-one injector-ignition fuel injector 7 of the invention will now be described. Specifically, the input fuel metering system 34 includes an inline fuel filter 11 for filtering the fuel, a metering solenoid 35 for metering a next fuel charge comprising a predetermined amount of fuel, and a liquid fuel needle valve 36 for dispensing the next fuel charge into a pressurizing chamber 37 of the fuel injector 7. The liquid fuel needle valve 36 preferably comprises an electromagnetically or piezoelectric activated needle valve that dispenses the next fuel charge into the pressurizing chamber 37 in response to a look ahead computer control algorithm in the engine control unit (ECU). The input fuel metering system 34 may accept fuel from a standard gasoline fuel pump or common rail distribution system.

With further reference to FIG. 8, the injector nozzle 38 of the all-in-one fuel injector 30 is disposed between the pressurization chamber 37 and the combustion chamber of the vehicle. The fuel charge dispensed by the input fuel metering system 34 is roasted in the pressurization chamber 37 via a hot section of the fuel injector 30 surrounding the chamber 37. More particularly, the fuel charge is heated in the pressurization chamber 37 under pressure and in the presence of catalysts, which begin to crack the fuel and cause it to react with internal sources of oxygen. The injector nozzle 38 comprises an injector nozzle pin valve 39, a collimator 40, and a pin valve actuator 41. Specifically, the nozzle pin valve 39 opens at approximately top dead center (180° of cycle rotation), allowing the hot pressurized gas into the combustion chamber. The pin valve actuator 41 may comprise a pin valve solenoid 43 which operates a pin valve drive shaft 42 for injecting the next fuel charge through the injector nozzle pin valve 39.

In the all-in-one fuel injector embodiment, the pin valve drive shaft 42 is located inside the bore of the pressurization ram 44 such that it may slide coaxially within the pressurization ram 44. However, the pin valve drive shaft 42 operates independently of the pressurization ram 44. An O-ring seal 45 on the top of the pressurization ram 44 blocks the leakage path between these two shafts. The geometry of the injector nozzle 38 varies substantially from a typical liquid fuel injector nozzle in that the injector nozzle 38 includes the pin valve 39 and a collimator 40 for collimating the heated fuel and dispensing a collimated, relatively low pressure charge of hot gas into the cylinder. Specifically, the injector nozzle 38 of the fuel injector 30 is electrically heated, for example using a conventional nichrome heating element that lines the injector nozzle 38.

The pin valve actuator 41 of the injector nozzle 38 may comprise a rapid response electromagnetic drive or a piezoelectric drive. In its simplest form, the injector nozzle pin valve 39 opens to 100% as the pressurization ram 44 pushes the entire column of hot gas from the pressurizing chamber 37 into the combustion chamber to full displacement of the injector volume. As would be understood by one of ordinary skill in the art, many combinations of pin valve and ram drive modulation may be employed with analog drive signals and/or digital pulse signals to produce various heat release profiles under different throttle and load situations, without departing from the scope of the present invention.

Figure 9:
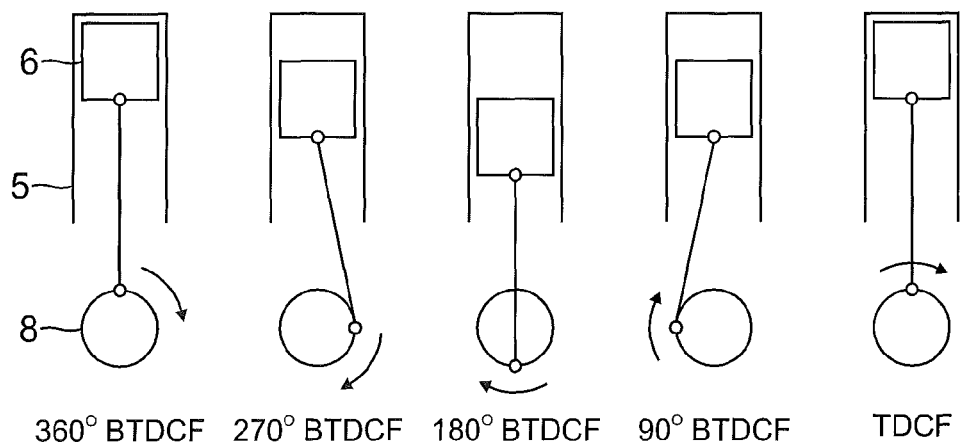
FIG. 9 is a schematic view demonstrating a sequence of the intake stroke and compression stroke.

FIG. 9 is a schematic view demonstrating a sequence of the intake stroke that can be defined as the rotational angle of the crankshaft 8 between 360° and 180° BTDCF and the compression stroke that can be defined as the stroke over the rotational angle of the crankshaft 8 between 180° BTDCF and TDCF (=0° BTDCF). The intake stroke starts at 360° before top dead center (BTDCF). After closing the exhaust valve, which may happen during the intake stroke at an angle between for instance 360° and 350° BTDCF, intake air is drawn into the cylinder 5 or in case of a turbocharged engine pressed into the cylinder while the piston 6 moves towards the bottom dead center.

At or shortly after reaching the bottom dead center at the rotational angle of 180° before the top dead center, the intake valve is closed and the compression starts during the compression stroke.

Figure 10:
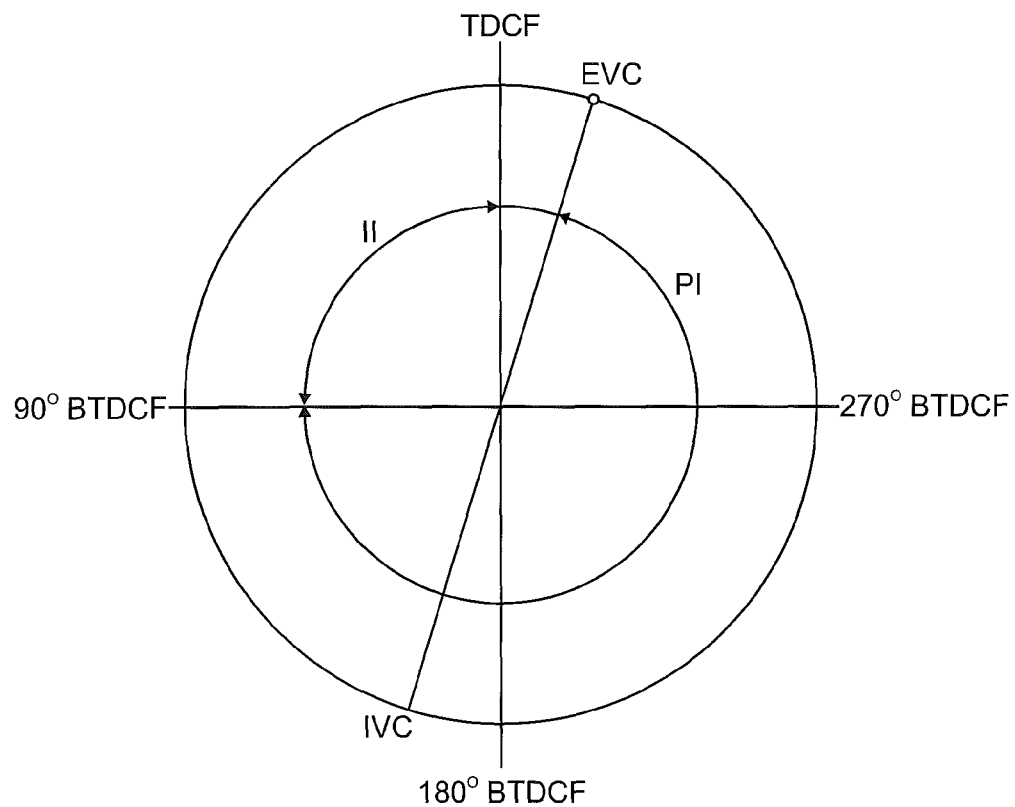
FIG. 10 is a diagram illustrating injection according to the present invention in correlation to the rotational angle of the crankshaft during the intake stroke and the compression stroke.

FIG. 10 is a diagram illustrating injection according to the present invention in correlation to the rotational angle of the crankshaft during the intake stroke and the compression stroke. The rotational direction is in a clockwise direction, starting from an angle of 360° BTDCF with the beginning of the intake stroke. The diagram ends at 0° meaning the top dead center TDCF which is approximately the angle where the ignition takes place. Injection typically starts in injection engines self-igniting of the fuel charge due to compression heat generated by compression of the fuel charge during the compression stroke. An ignition-injection is typically injected during a rotational angle between 90° BTDCF and at TDCF, or sometimes at least in part after TDCF. In the diagram according to FIG. 10, this ignition-injection is denoted II.

The pre-injection may begin during the intake stroke at the time of closing the exhaust valve, or even as early as immediately prior to closing the exhaust valve, or any time after closing the exhaust valve up to a rotational angle of the crankshaft to about 90° BTDCF. The pre-injection according to the present invention is defined as an early injection or a sequence of early on injections that are made prior to the final ignition-injection that typically happens at a rotational angle between 90° before the top dead center BTDCF and the top dead center TDCF.

The pre-injection is denoted in the diagram with PI. According to the invention, it was found out that the early pre-injection results in a better mixing of the fuel with air as it has been demonstrated and described in connection with FIG. 6 above. In particular, an early injection during the intake stroke results either in early on partial vaporization and a breaking up into fine droplets of the pre-injected fuel or if pre-injected under supercritical conditions in a condensation from the supercritical phase straight into very fine droplets and possibly later vaporization. This process is enhanced by the relatively low pressure within the cylinder during the intake stroke, which may even be a negative pressure or in case of a turbocharged engine a moderate pressure above ambient pressure, for instance 1-2 bar.

Apart from the early pre-injection allowing more time as compared to the prior art for physically conditioning the fuel be it by vaporization or simply breaking up into smaller droplets, it allows also time for the fuel charge to condense into small droplets that are much finer than the droplet size that can be generated by those sprays formed by the injection nozzle. In addition, the much longer contact with the intake air enhances conditioning of the fuel for combustion and results in a more complete combustion increasing efficiency and reducing exhaust gases that are harmful to the environment.

In the prior art, it was believed not to be possible to achieve both pre-injection during the intake stroke and ignition-injection during the compression stroke using supercritical fuel injection. During the intake stroke the phase change of the fuel from supercritical conditions results in very small droplets being formed, thus enhancing mixing of the fuel and the air. During the compression stroke the ignition-injection remains in the supercritical state, achieves rapid mixing with the air and the increased temperatures reduce the chemical ignition delay leading to compression ignition and combustion of the complete charge.

Figure 11:
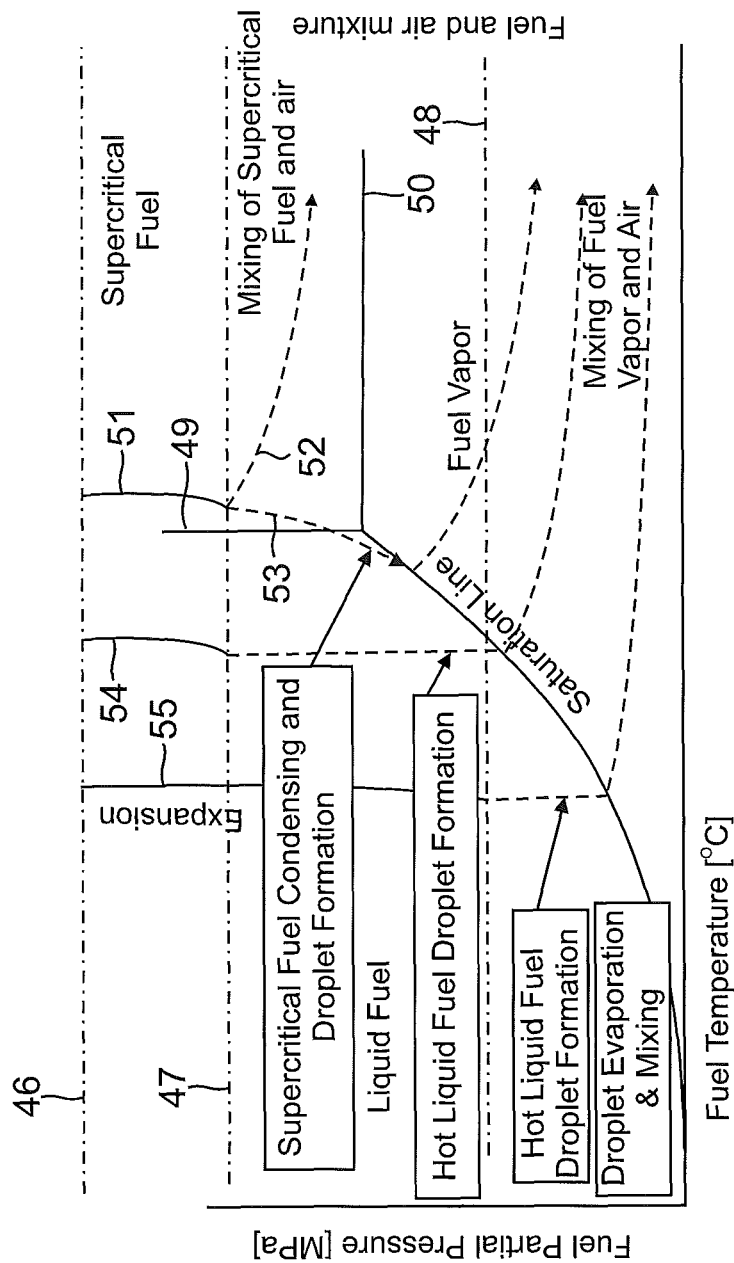
FIG. 11 is a diagram illustrating the phase changes of the fuel considering pre-injection into the non-supercritical intake cycle as well as ignition-injection into the supercritical compression cycle and a comparison to the phase changes for conventional liquid injection.

FIG. 11 is a diagram illustrating the phase changes of the fuel considering pre-injection into the non-supercritical intake cycle as well as ignition-injection into the supercritical compression cycle and a comparison to the phase changes for conventional liquid injection. The diagram demonstrates for different scenarios the fuel temperature over the fuel pressure in correlation to the phase of the fuel. Various pressure levels are denoted by the lines 46, 47 and 48. The pressure level demonstrated by line 46 is the fuel pressure in the injector at the time of injection. The pressure level demonstrated by line 47 is the cylinder pressure at the time of injecting the ignition-injection that is made at an angle of between 270° BTDCF and TDCF. Typically, this ignition-injection is made close to TDCF, for instance at 10° BTDCF. The lowermost pressure level demonstrated by line 48 shows the cylinder pressure at the time of pre-injection. This pressure is shown as a positive pressure. Since the pre-injection can be performed during the intake stroke, the cylinder pressure may actually be below ambient pressure as the moving piston sucks intake air into the cylinder. However, pre-injection can happen also in part during the compression stroke at a pressure above ambient pressure. Further, in case of turbocharged engines, the pressure can be above ambient pressure even during the intake stroke.

The vertical line 49 building a right angle with the horizontal line 50 in the diagram demonstrates the borders for the supercritical condition of the fuel. This means that the temperature and pressure are above the critical point where distinct liquid and gas phases do not exist. Supercritical fluids can for instance effuse through solids like a gas and solve materials like a liquid. As demonstrated by lines 49 and 50, fuel is in a supercritical phase above a certain pressure at a certain temperature. The critical point is the point where the lines 49 and 50 intersect and enclose a right angle.

The line 51 demonstrates injection starting from a fuel pressure in the injector that is denoted by the line 46. During the injection, the pressure drops from the pressure in the injector to the pressure in the cylinder. For instance for the ignition charge where the pressure in the cylinder is at the level 47 prior to ignition, and at a high temperature above the line 49 due to compression heat, the fuel stays in the supercritical condition but mixes with the air. This process is demonstrated by the line 52 as the fuel mixes with air and the partial fuel pressure decreases from the pressure at ignition-injection.

In contrast to line 52 that demonstrates for instance the ignition-injection, line 53 demonstrates the pre-injection. Like for the ignition-injection, also the pre-injection is injected under supercritical fuel conditions as demonstrated by line 51. However, in contrast to the ignition-injection, the pre-injection is done at relatively low cylinder pressures, that may even be below ambient pressure, and low cylinder temperature. Consequently, the fuel first condenses from the supercritical phase directly to the liquid phase as the partial pressure of the fuel decreases and the temperature decreases, and the so-formed condenses into fine droplets. Therefore, the fuel transitions first from the supercritical conditions to liquid in the form of fine droplets that have a high propensity to evaporate and form vapor, due to a high surface area to volume ratio, and that vapor can readily mix with air. These fuel droplets are much finer than what can be accomplished by a spray generated by a nozzle, and further the range of fuel droplet sizes generated by condensation is much smaller than the range of different sizes—also known as droplet size distribution—that can be generated by a liquid spray that is generated by a nozzle. For instance, droplet size for droplet generated by condensation may range predominantly between 5 and 10 μm, while droplet size generated by a nozzle may range approximately between 10 and 75 μm, predominantly between 20 and 75 μm. Also, the average diameter of the droplets generated by condensation may range between 5 and 10 μm, while the average droplet size generated by a nozzle may be between 20 and 30 μm. The finer the fuel droplets, the bigger the surface to volume ratio and therefore the higher the rate of vaporization of the fuel droplets.

Line 54 demonstrates a scenario where the pre-injection takes place under heated conditions and high pressure of the fuel, but the combination of pressure and temperature is not reaching the supercritical condition. Substantially the injection process is one of heated liquid injection and droplet formation. The fuel pressure in the liquid injection drops from the injection pressure to the cylinder pressure during the intake stroke. During this pressure drop, the liquid injection breaks up into high temperature droplets having a high propensity to evaporate.

For contrasting the present invention with the prior art, line 55 demonstrates a conventional liquid injection of fuel through a nozzle. The fuel is at a lower temperature, typically at around the motor block temperature that is kept in water-cooled engines to about the boiling temperature of water (212° F. or 100° C.) or even below. The spray stays as liquid droplets and does not go through a subsequent condensing process as in the present invention forming finer droplets or breaking up into high temperature droplets if the injection according to the invention is made to some degree below supercritical conditions.

Figure 12:
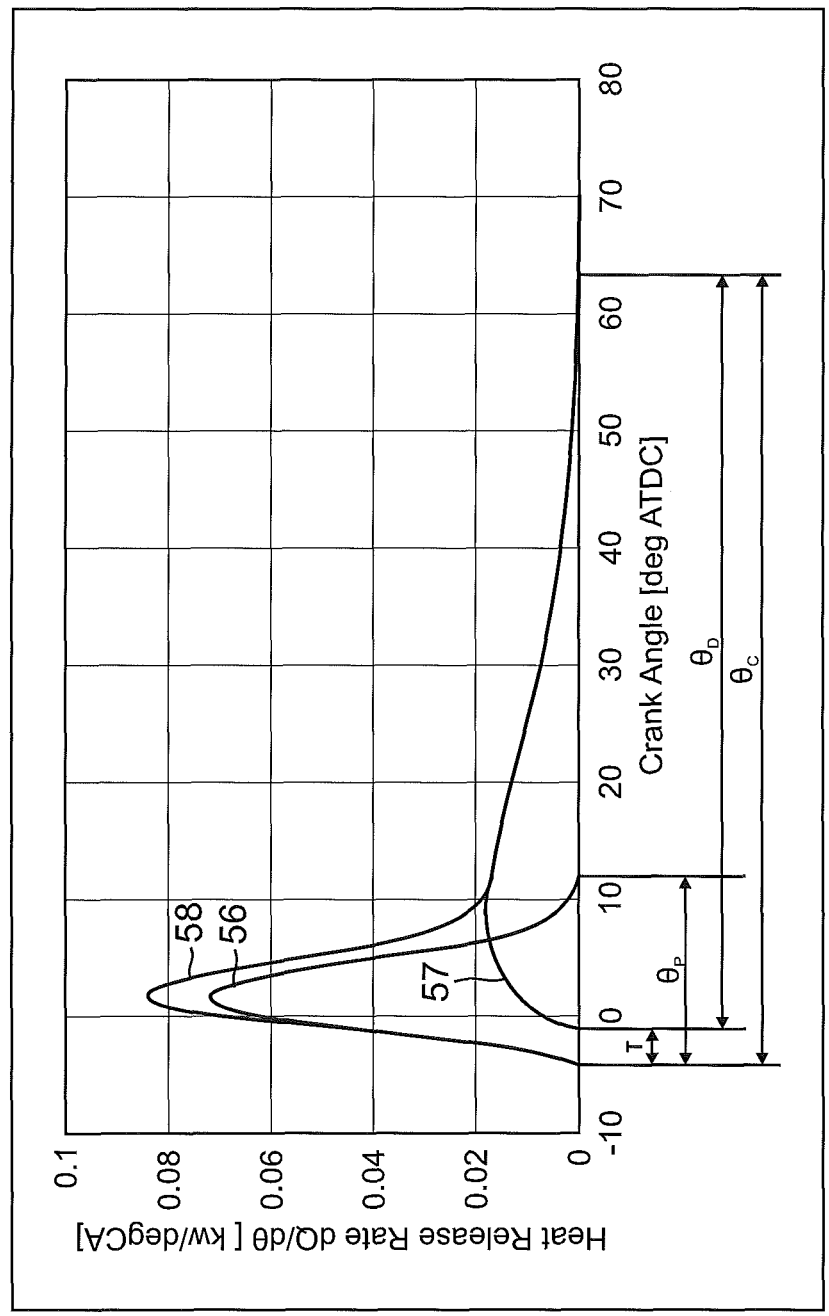
FIG. 12 is a diagram showing the heat release over the crank angle for premixed combustion, diffusion combustion, a superposition of premixed combustion and diffusion combustion according to the present invention.

FIG. 12 is a diagram showing the heat release over the crank angle for premixed combustion, diffusion combustion, a superposition of premixed combustion and diffusion combustion according to the present invention. The graph denoted by reference numeral 56 demonstrates premixed combustion. This premixed combustion is triggered by the aforementioned ignition-injection taking place depending on the compression parameters and the fuel that is used between 90° BTDCF and TDCF, but typically closer to TDCF, for instance at a crank angle of 10° BTDCF. According to the incident invention, this ignition-injection is made in the supercritical phase of the fuel while at the same time the air-fuel mixture that was generated by the pre-injection within the crank angle range between 360° BTDCF and 90° BTDDCF is likewise in the supercritical phase. The fuel injected as the ignition-injection therefore ignites quickly at several locations simultaneously and results in a very fast combustion. This explains in the graph according to FIG. 12 the fast increase in the heat release rate closely after the ignition-injection is made, for instance at a crank angle of 4° before reaching TDCF, spikes at only very few degrees after TDCF, for instance at a crank angle of 2° ATDCF, and also drops quickly to become almost 0 at a crank angle of 10° ATDCF.

In contrast, the diffusion combustion develops a little later, for instance at a crank angle of about TDCF or a little earlier, for instance at a crank angle of 1°, but provides a less aggressive heat release rate over the crank angle since a wave front of the flame needs to develop and diffuse through the mixture of fuel and air. This curve demonstrating the diffusion combustion is denoted by reference numeral 57.

Reference numeral 58 denotes the superposed combustion that results from the combination of premixed combustion and diffusion combustion. The invention achieves the best of both worlds, namely a fast premixed combustion that has good efficiency properties but balances this with a diffusion combustion that provides a milder heat release but over a longer crank angle.

The combination of an early pre-injection under heated or even supercritical conditions of the fuel in combination with injecting an injection ignition under supercritical conditions provides according to the present invention that even for low reactivity fuel such as gasoline no spark plug ignition is necessary. This can in part be explained by the more advantageous conditioning of the pre-mixed fuel into finer droplets, for instance due to condensation from a supercritical phase, or simply by breaking up into finer droplets under heated and pressurized conditions that may be close to supercritical phase. Another explanation for the better conditioning of the pre-mixed fuel is the much longer crank angle allowing a more even distribution of the fine droplets or in simple terms a better mixing of the fuel with the air due to more time.

Another reason for a better mixing is that the pre-injected fuel is subjected to a part of the intake stroke cycle when the piston speed is the fastest at around 270° BTDC so that the speed of the intake air flowing into the cylinder is the fastest. This also helps breaking up the fuel into finer droplets. This combination of effects that were found by the present invention allows also fuels of low reactivity to be ignited by an ignition-injection and subsequently combust predominantly by diffusion combustion. The lower the reactivity of the fuel, the higher the percentage of pre-injected fuel can be, or the higher the temperature of the heated pre-injection fuel can be at the time of injection. However, since the diffusion combustion is still preserved even for the pre-injected fuel at the same time a more balanced combustion is provided that alleviates the disadvantages that would otherwise result from an almost exclusive premixed combustion, such as noise and vibration.

LIST OF REFERENCE NUMERALS 1 vehicle
2 fuel supply
3 engine
4 fuel line
5 cylinders
6 pistons
7 fuel injector 8 crankshaft
9 fuel
10 engine system
11 fuel filter
12 fuel pump
13 pressure regulator
14 computer
15 fuel injector
16 fuel system
17 engine control unit
18 common rail
19 pump system
20 tachometer
21 pressure sensor
22 distribution sensor
23 distribution channel
24 outlet
25 cam sensor
26 crank sensor
27 volume injection step
28 droplet forming step
29 vaporizing step
30 fuel vapor mixing step
31 radicals forming step
32 physical delay
33 chemical delay
34 input fuel metering system
35 metering solenoid
36 liquid fuel needle valve
37 pressurizing chamber
38 injector nozzle
39 nozzle pin valve
40 collimator
41 pin valve actuator
42 pin valve drive shaft
43 pin valve solenoid
44 pressurization ram
45 O-ring seal
46-55 Lines in FIG. 11
56 heat release graph premixed combustion
57 heat release graph diffusion combustion
58 heat release graph superposed premixed and diffusion combustion

What is claimed is:

1. A fuel injection method in an internal combustion engine comprising at least one piston that is connected to a crankshaft and reciprocates within a cylinder between a top dead center and a bottom dead center while the crankshaft rotates between an angular range of 360° before top dead center firing BTDCF and the top dead center firing TDCF, the piston performing over at least part of the range between 360° and 180° BTDCF an intake stroke and over at least part of the rotational angle between 180° BTDCF and TDCF a compression stroke, said method comprising:
heating fuel to a temperature between 300° F. and 840° F. (150 and 450° C.);
pressurizing the fuel to a pressure exceeding 40 bar;
pre-injecting at least 10% of the fuel charge as a pre-injected fuel during the intake stroke;
injecting a fuel charge over at least part of the compression stroke into the cylinder; and
injecting an ignition-injection of at least 10% of the fuel in a supercritical condition during the compression stroke at a rotational angle between 90° BTDCF and TDCF into the cylinder.

2. The fuel injection method of claim 1, wherein between 10 and 20% of the fuel charge is pre-injected during the intake stroke.

3. The fuel injection method of claim 1, wherein between 20 and 30% of the fuel charge is pre-injected during the intake stroke.

4. The fuel injection method of claim 1, wherein between 30 and 50% of the fuel charge is pre-injected during the intake stroke.

5. The fuel injection method of claim 1, wherein between 50 and 90% of the fuel charge is pre-injected during the intake stroke.

6. The fuel injection method of claim 1, wherein the pre-injected fuel is heated and pressurized to assume supercritical conditions prior to pre-injecting.

7. The fuel injection method of claim 1, further comprising the method steps:
pre-injecting the pre-injected fuel under supercritical conditions;
at least partially condensing the supercritical pre-injected fuel to droplets; and
compressing the fuel charge during the compression stroke to reach supercritical conditions prior to injecting the ignition-injection.

8. The fuel injection method of claim 1, further comprising the method steps:
pre-injecting the pre-injected liquid fuel under heated conditions to break up into droplets;
at least partially vaporizing the pre-injected fuel within the cylinder to become fuel vapor; and
compressing the fuel charge during the compression stroke to reach supercritical conditions prior to injecting an ignition-injection.

9. The fuel injection method of claim 1, further comprising pre-injecting in total between 10 and 90% of the fuel charge as pre-injected fuel during a cycle including both the intake stroke and the compression stroke, and injecting between 10 and 90% of the fuel charge as ignition-injection fuel.

10. The fuel injection method of claim 9, further comprising that at least one of the pre-injected fuel and the ignition-injection fuel are under supercritical conditions prior to and during injection.

11. The fuel injection method of claim 9, further comprising that both of the pre-injected fuel and the ignition-injection fuel are under supercritical conditions prior to and during injection.

12. The fuel injection method of claim 1, further comprising providing gasoline as a fuel, pressurizing the gasoline to at least 40 bar, and heating the gasoline to a temperature between 540° F. and 660° F. (280° C. and 350° C.).

13. The fuel injection method of claim 1, further comprising providing diesel fuel as a fuel, pressurizing the diesel fuel to at least 40 bar, and heating the diesel fuel to a temperature between 720° F. and 840° F. (380° C. and 450° C.).

14. The fuel injection method of claim 1, further comprising dividing the pre-injection into a series of small individual pre-injection shots.

15. The fuel injection method of claim 1, further comprising starting the pre-injection during the intake stroke at an angle after 355° BTDCF.

16. An internal combustion engine comprising:
at least one piston that is connected to a crankshaft and reciprocates within a cylinder between a top dead center and a bottom dead center while the crankshaft rotates between an angular range of 360° before top dead center BTDCF and the top dead center TDCF, the piston performing over at least part of the range between 360° and 180° BTDCF an intake stroke and over at least part of the rotational angle between 180° BTDCF and TDCF a compression stroke;

a fuel injector arranged in fluid connection with the cylinder;

a heater for heating the fuel prior to injection to a temperature between 300° F. and 840° F. (150 and 450° C.);

a pump pressurizing the fuel prior to injection to a pressure of at least 40 bar; and a control connected to the fuel injector, said control being configured to control the magnitude of the fuel charge to be injected during a cycle between 0 and 360°, to pre-inject at least 10% of the fuel charge as a pre-injected fuel during the intake stroke; to inject a fuel charge over at least part of the compression stroke into the cylinder; and to inject an ignition-injection of at least 10% of the fuel in a supercritical condition during the compression stroke at a rotational angle between 90° BTDCF and TDCF into the cylinder.

17. The internal combustion engine of claim 16, wherein the control is configured to pre-inject between 10 and 20% of the fuel charge during the intake stroke.

18. The internal combustion engine of claim 16, wherein the control is configured to pre-inject between 20 and 30% of the fuel charge during the intake stroke.

19. The internal combustion engine of claim 16, wherein the control is configured to pre-inject between 30 and 50% of the fuel charge during the intake stroke.

20. The internal combustion engine of claim 16, wherein the control is configured to pre-inject between 50 and 90% of the fuel charge during the intake stroke.

21. The internal combustion engine of claim 16, wherein the heater and the pump are configured to heat and pressurize the pre-injected fuel to assume supercritical conditions prior to pre-injecting.

22. The internal combustion engine of claim 16 comprising such a compression ratio that the fuel charge during the compression stroke reaches supercritical conditions prior to injecting an ignition-injection.

23. The internal combustion engine of claim 16, wherein the control is configured to pre-inject in total between 10 and 90% of the fuel charge as pre-injected fuel during a cycle including both the intake stroke and the compression stroke, and to injecting between 10 and 90% of the fuel charge as ignition-injection fuel.

24. The internal combustion engine of claim 23, wherein the heater and the pump are configured to heat and pressurize the pre-injected fuel and ignition-injection fuel so that at least one of the pre-injected fuel and the ignition-injection fuel are under supercritical conditions prior to and during injection.

25. The internal combustion engine of claim 23, wherein the heater and the pump are configured to heat and pressurize the pre-injected fuel and ignition-injection fuel so that both the pre-injected fuel and the ignition-injection fuel are under supercritical conditions prior to and during injection.

26. The internal combustion engine of claim 16, wherein the internal combustion engine is a gasoline powered engine and the heater and the pump are configured to pressurize gasoline to at least 40 bar and heating the gasoline to a temperature between 540° F. and 660° F. (280° C. and 350° C.).

27. The internal combustion engine of claim 16, wherein the internal combustion engine is diesel fuel powered engine and the heater and the pump are configured to pressurize a diesel fuel to at least 40 bar and heating the diesel fuel to a temperature between 720° F. and 840° F. (380° C. and 450° C.).

28. The internal combustion engine of claim 16, wherein the fuel injector is configured to divide the pre-injection into a series of small individual pre-injection shots.

29. The internal combustion engine of claim 16, wherein the control is configured to start the pre-injection during the intake stroke at an angle between 355 and 345° BTDCF.

* * * * *